United States Patent Office 3,249,570
Patented May 3, 1966

3,249,570
TERPOLYMER OF ETHYLENE, ALKYL ACRYLATE
AND ACRYLIC ACID
James E. Potts, Bernards Township, Chester L. Purcell, Somerville, and Robert J. Turbett, Passaic Township, N.J., assignors to Union Carbide Corporation, a corporation of New York
No Drawing. Filed Nov. 15, 1962, Ser. No. 238,006
20 Claims. (Cl. 260—29.6)

The invention relates to novel polymeric compositions. In a particular aspect, the invention relates to novel terpolymers of ethylene, alkyl acrylate, and acrylic acid which range from low molecular weight, waxlike materials to high molecular weight, tough materials which have superior mechanical properties and which possess greater adhesivity, impermeability and clarity than heretofore known ethylene homopolymers or ethylene/alkyl acrylate copolymers.

Presently available homopolymers and copolymers of ethylene are in the main relatively inert chemically because of their primarily hydrocarbon structure. They adhere poorly to substrates such as metals, cloth, paper, plastics, and the like, and are not adhered to by inks, glues, coatings and similar materials. Because of their inert structure, most ethylene homopolymers and copolymers are incapable of undergoing chemical reactions which do not involve a free radical mechanism, and cannot be modified chemically, for example by reaction with various polyfunctional compounds, in order to improve certain of their physical properties. High molecular weight copolymers of ethylene and polar vinyl monomers such as those containing reactive functional groups such as hydroxyl and carboxyl have been prepared by high pressure polymerization techniques, but only with difficulty and at low productivity rates compared with the productivity attained in the homopolymerization of ethylene. Copolymerization of ethylene with vinyl monomers containing carboxyl and other polar groups has not as yet been effected using low pressure catalytic techniques.

In accordance with the present invention ethylene/alkyl acrylate/acrylic acid terpolymers have now been discovered which offer greatly improved physical properties over those possessed by ethylene homopolymers or ethylene/ethyl acrylate copolymers. These terpolymers comprise a predominant amount of combined ethylene, from about 0.1 to about 40 weight percent combined acrylic acid and up to 30 weight percent combined alkyl acrylate.

By the term "alkyl acrylate" as used in the present specification and claims is meant alkyl esters of acrylic acid wherein the alkyl group contains from 1 to 12 carbon atoms inclusive and preferably from 2 to 8 carbon atoms inclusive. Examples of such alkyl acrylates include methyl acrylate, ethyl acrylate, n-propyl acrylate, isopropyl acrylate, n-butyl acrylate, t-butyl acrylate, pentyl acrylate, hexyl acrylate, 2-ethylhexyl acrylate, octyl acrylate, decyl acrylate, dodecyl acrylate, and the like. These alkyl acrylates are merely illustrative, however, and are not intended to be restrictive of the alkyl acrylates which can be utilized in the invention.

Alkaline or acidic hydrolysis of ethylene/alkyl acrylate copolymers, which can be prepared by any suitable high pressure reactor polymerization process, such as the process described in U.S. 2,953,551, converts a portion of the acrylate groups to carboxyl groups. The ethylene/alkyl acrylate/acrylic acid terpolymers which result now contain reactive "handles" in the form of pendant carboxyl groups, which impart to the polymer a combination of properties not obtainable with presently available ethylene homopolymers and copolymers.

Ethylene/alkyl acrylate/acrylic acid terpolymers covering a wide range of trimonomer content and having a modulus in the range 2,000 to 20,000 have been prepared and examined and their properties compared to those of polyethylene and ethylene/ethyl acrylate copolymers. Specifically, ethylene/alkyl acrylate/acrylic acid terpolymers exhibit improvements in adhesion, impermeability, chemical reactivity, mechanical properties, and clarity as compared with ethylene homopolymers or ethylene/alkyl acrylate copolymers. These terpolymers can be used in the extrusion coating of paper, especially for grease barrier applications where ease of printing and gluing is also needed and they also find application in knife coating, dip coating, and spray coating techniques. Other examples of areas where advantage can be taken of the adhesion of these terpolymers to a wide variety of substrates are in skin packaging, wax additives, hot melt adhesives, fiberboard binders, and plywood bindings. The terpolymers as additives so improve stress cracking that low density polyethylene blends containing the terpolymer can be used for flexible blow molded bottles and aerosol tubing. The high strength, ease of orientation, low creep, and low stress rupture of these terpolymers make them suitable for monofilaments and rope. The chemical reactivity of the pendant carboxyl groups of the terpolymers allows the use of the terpolymers as flexibilizers for urethanes, epoxies, and phenolics. Although polyethylene and ethylene/ethyl acrylate copolymers cannot be emulsified, stable, non-creaming emulsions can readily be prepared from the terpolymers of this invention. This ease of emulsifiability makes possible, for example, the use of a low molecular weight terpolymer as an emulsifiable wax and high molecular weight terpolymer emulsions as coating compositions.

The composition range of useful ethylene/alkyl acrylate/acrylic acid terpolymers is conveniently controlled by the composition of the parent ethylene/alkyl acrylate/copolymer and by the degree of hydrolysis. The preferred upper and lower limits of alkyl acrylate in the ethylene/alkyl acrylate copolymers are shown in Table I. The composition ranges of ethylene/alkyl acrylate/acrylic acid terpolymers which can be prepared from these ethylene/alkyl acrylate copolymers are also shown in Table I.

TABLE I

| Composition of Parent Ethylene: Alkyl Acrylate Copolymer (mole ratio) | Composition of Derived Ethylene:Alkyl Acrylate:Acrylic Acid Terpolymer (mole ratio) |
|---|---|
| 3.33:0.07 | 3.33:0.05:0.02 to 3.33:0.01:0.06 |
| 2.4:0.33 | 2.4:0.3:0.03 to 2.4:0.01:0.32 |

The terpolymers described in Table I were prepared by alkaline hydrolysis of a portion of the pendant ester groups of ethylene/alkyl acrylate copolymers. The method found most suitable for accomplishing the hydrolysis consisted of the following steps:

(1) Saponifying the ethylene/alkyl acrylate copolymer in a toluene-n-butanol-methanol-water mixed solvent system.
(2) Adjusting the mixture to a pH of about 5.
(3) Recovery of the ethylene/alkyl acrylate/acrylic acid terpolymer by precipitation from a nonsolvent, preferably acetone.

The product was washed free of inorganic salts with water and dried under diminished pressure at 50–60° C. The infrared spectrum of the resulting terpolymer displayed absorption characteristic of ester and acid carbonyl functions at $5.75\mu$ and $5.84\mu$, respectively. The degree of hydrolysis of the ester groups of the terpolymer is dependent upon the initial alkyl acrylate concentration in the parent copolymer, the concentration of the base used in the saponification step, and, to a lesser degree, the reaction time used in the saponification step.

Acidic hydrolysis conditions, such as with sulfuric, phosphoric, or hydrochloric acids, can also be employed with equal facility. The primary requirement for either acidic or basic hydrolysis is that the solvent system retain the copolymer in solution and, at the same time, allow good contact between the copolymer and the acid or base used in the hydrolysis step.

The molecular weight of useful ethylene/alkyl acrylate/acrylic acid terpolymers can vary over a wide range. The molecular weights of these polymers are usually characterized by their melt index values. Useful terpolymers in this invention are those terpolymers having a melt index greater than about 0.5 decigram per minute (at 190° C. and 44 p.s.i.) down to low molecular weight waxes. Terpolymers of melt index below about 30 are preferred for fabrication into useful shapes and forms such as bottles, film, and similar articles (by such techniques as extrusion, blow molding, compression molding, injection molding, and the like) in the "as made" form.

The composition of terpolymers which is useful in the "as made" form can vary considerably within the limits of composition shown in Table I. It is preferable that the terpolymers containing high concentrations (about 15 to 20 weight percent) of alkyl acrylate be high in melt index (i.e., lower in molecular weight) because the ethylene/alkyl acrylate copolymers containing high concentrations of ethyl acrylate from which these particular terpolymers are obtained are most easily and most economically prepared in the lower molecular weight ranges. If terpolymers which contain high concentrations of alkyl acrylate need be higher in molecular weight for a particular application, however, the molecular weight can be upgraded, for example by subjecting the terpolymer to ionizing radiation such as electrons from a Van de Graaff accelerator. In the terpolymer combined ethylene can comprise from about 64 to about 99.4 weight percent and combined alkyl acrylate can compromise from about 0.5 to about 30 weight percent. The concentration of acrylic acid in useful "as made" terpolymers is not particularly critical. Compositions containing as low as about 0.1 weight percent and as high as about 6 weight percent acrylic acid exhibit excellent adhesion and printability characteristics. For the best properties in a terpolymer with a modulus in the same range as low density polyethylene, for example, a terpolymer comprising from about 3 to about 5 weight percent acrylic acid and from about 0.5 to about 2 weight percent alkyl acrylate is required. Also, it will be noted that in the ethylene/alkyl acrylate/acrylic acid terpolymer series as the percentage carboxyl increases, impact strength, strength after orientation, weatherability, melting point, adhesion, and grease resistance improve. As the percentage alkyl acrylate increases modulus, vicat heat distortion, and melting point decrease while clarity, gas permeability, and stress crack resistance increase. Low alkyl acrylate content favors low creep. The preferred compositions and molecular weight ranges of these terpolymers, therefore, are dictated by the particular application for which they are intended.

The ethylene/alkyl acrylate/acrylic acid terpolymers of this invention cover a spectrum of stiffness down to and including the elastomeric range, depending upon the ethyl acrylate content. Stiffness-temperature curves of these cured, filled terpolymers are essentially similar to those of the commercial polyethylene-carbon black-peroxide cross-linked systems. Elevated temperature tensile strengths (at 100° C. and 150° C.) are also approximately the same for both systems.

A great number of common fillers are accepted with ease by these terpolymers; examples of such fillers are carbon blacks, clays, magnesium silicates, and silica. The high tensile strengths and low brittleness temperatures of these compositions are especially noteworthy.

To illustrate the invention more fully, the following descriptions and examples are given.

GENERAL

The ethylene/alkyl acrylate/acrylic acid terpolymers described herein were prepared by hydrolyzing a portion of the acrylate groups of ethylene/alkyl acrylate copolymers. The copolymer was treated with base in a toluene-n-butanol-methanol-water mixed solvent system acidified and precipitated into excess acetone, filtered, washed free of salt, and dried. The acidity of the final product, i.e., the number of free carboxyl groups in the terpolymer, was controlled by the concentration of the hydrolyzing base, the acrylate content of the parent copolymer, and the reaction time of the saponification step. Prior to physical testing, plaques of ethylene/alkyl acrylate/acrylic acid terpolymer and of ethylene/alkyl acrylate copolymer were molded in a 6½" x 8" x 0.040" plaque mold at 150° C. and 30,000–40,000 p.s.i. pressure. In some cases the terpolymers were compounded on a two-roll mill at 110–120° C. with various curing agents, accelerators, fillers, and stabilizers and were molded as described except that the compositions were maintained at 150° C. under pressure 30 minutes. Physical properties were measured on samples using the following test methods:

| Test: | ASTM No. |
|---|---|
| Ultimate tensile and percent elongation | D-412-51T. |
| Vicat softening point | D-1525-58T. |
| Tensile impact strength | ([1]). |
| Tensile set at 100% elongation | D-470. |
| Secant modulus of elasticity | D-638.[2] |
| Environmental stress crack resistance | ([3]). |
| Melt index | D-1238-58T at 44 p.s.i. |

[1] An Izod testing machine is used to run this test. The test specimen, in the form of a ⅜" x 2½" x 0.040" plaque is mounted in a horizontal position in a device consisting of two clamps. One clamp is stationary and the other is free permitting horizontal travel. After the sample is mounted, a calibrated pendulum is allowed to strike the free clamp. The momentum of the pendulum drives the clamp along a horizontal path, thus elongating the sample. The force, in foot pounds per square inch, required to break the sample is then calculated.

[2] The test specimen is the "A" die size, as described in ASTM D-412.

[3] To determine stress crack resistance, a 125 mil compression molded specimen 0.5" x 1.5" was slit along the long dimension. The slit was 20 mils deep and 75 mils long. The specimen was then bent 180°. Ten such bent specimens were held in a channel which was then immersed in Hostapal (a non-ionic surfactant believed to be similar to nonyl phenoxy polyoxyethylene ethanol) in a test tube, providing 20 specimens per test. Time to failure of any one specimen was the appearance of a crack perpendicular to the slit; "F₅₀" is the time to failure of 50 percent (i.e., 10) of the specimens.

Other tests (for example, printability, adhesion, and permeability) are described in individual examples. Where indicated the symbols P, F, G, VG and E indicate, respectively, poor, fair, good, very good and excellent. All parts, percentages and monomer ratios given in the following examples are by weight unless otherwise indicated.

*Example 1*

A three-liter, three-necked, round-bottomed flask equipped with a reflux condenser, compressed air-driven stirrer (glass shaft, Teflon blade) and dropping funnel was charged with 300 grams ethylene/ethyl acrylate copolymer containing 83.5 percent ethylene and 16.5 percent ethyl acrylate polymerized therein, and 1200 grams reagent grade toluene. After the copolymer had completely dissolved at 80–90° C., there was added, via the dropping funnel, 62.5 milliliters of 2 N potassium hydroxide (0.125 mole, or 0.0625 mole potassium hydroxide per 100 grams copolymer) in methanol-n-butanol. This potassium hydroxide solution was prepared as follows: 16.5 grams (0.25 mole) of 85 percent potassium hydroxide was dissolved in 75 milliliters methanol (commercial grade containing about 0.1 percent water) and was diluted to 125 milliliters with reagent grade n-butanol. After addition of the potassium hydroxide solution was completed, the system formed an azeotrope (boiling point 78–80° C.); saponification was continued at reflux for 1 hour. At the end of this time the system was acidified by adding 75 milliliters (0.15 mole) of 2 N methanolic HCl.

After the acidification (to pH 2–3) was complete the system was cooled at 45° C. and 500 milliliters acetone was added to effect partial precipitation of the product. The system was then cooled to 25–30° C., and the terpolymer precipitated with stirring into 4–5 liters of acetone. The product was filtered, washed free of chlorides with water, and dried under reduced pressure at 70° C. for 16 hours. The product had a melt index of 1.6 and contained 2.6 percent carboxyl groups as determined by titration with methanolic potassium hydroxide in xylene solution and 10.5 percent ethyl acrylate (by difference). This corresponds to a weight ratio of 85.4:10.5:4.1 ethylene/ethyl acrylate/acrylic acid.

terpolymer and displayed ester and acid carbonyl absorptions at $5.75\mu$ and $5.85\mu$, respectively.

Example 4

Partial hydrolysis of 200 grams of ethylene/ethyl acrylate polymer containing 83.5 percent ethylene and 16.5 percent ethyl acrylate polymerized therein and having a melt index of 3.8 was effected under the conditions described in Example 1 except that a charge of 250 milliliters of the 2 N potassium hydroxide solution described therein was used. This volume of potassium hydroxide solution corresponds to 0.25 mole potassium hydroxide per 100 grams copolymer. An ethylene/ethyl acrylate/acrylic acid terpolymer of melt index 3.2 was produced. The terpolymer had an acrylic acid content of 4.1 percent, an ethyl acrylate content of 10.7 percent, and an ethylene content of 85.2 percent.

Physical properties of the terpolymers prepared in Examples 1 and 4, and of their respective parent ethylene/ethyl acrylate copolymers, were measured. The tests were conducted using compression molded plaques of the polymers, prepared in the manner described earlier. Table II records data for these experiments.

TABLE II

|  | Control 1 | Example 1 | Control 4 | Example 4 |
| --- | --- | --- | --- | --- |
|  | Ethylene/Ethyl Acrylate Copolymer (93:7) | Ethylene/Ethyl Acrylate/Acrylic Acid Terpolymer (85.2:10.7:4.1) | Ethylene/Ethyl Acrylate Copolymer (83.5:16.5) | Ethylene/Ethyl Acrylate/Acrylic Acid Terpolymer (94.7:1:4.3) |
| Melt index (decigrams/minute) | 3.8 | 1.6 | 4.3 | 3.2 |
| Tensile strength (p.s.i.) | 1,948 | 2,697 | 1,451 | 2,267 |
| Elongation (percent) | 720 | 540 | 715 | 575 |
| Secant modulus at 1% elongation (p.s.i.): |  |  |  |  |
| At 25° C. | 11,932 | ---- | ---- | 14,822 |
| At 100° C. | 0 | ---- | ---- | 5 |
| At 250° C. | 0 | ---- | ---- | 2 |
| Tensile impact strength | 365 | 556 | 387 | 399 |
| Vicat softening point (° C.) | 84.8 | 61.3 | 54.9 | 88.1 |

Example 2

A three-liter round-bottomed flask was charged with 2000 milliliters of a 0.5 N potassium hydroxide solution having the following composition: 99 grams potassium hydroxide, 60 milliliters water, 390 milliliters triethylene glycol, 900 milliliters hexyl alcohol, and 1650 milliliters xylene. To this solution was added 240 grams of ethylene/ethyl acrylate copolymer wax (97.7 percent ethylene and 2.3 percent ethyl acrylate; viscosity at 140° C., 540 centipoises). The system was held at reflux (110° C.) for 4 hours, with stirring, and then acidified with 130 milliliters of 37 percent HCl. The product was precipitated into excess acetone, recovered by filtration, washed twice with a volume of water about twice the weight of the polymer, twice with equal amounts of acetone, and then dried. The infrared spectrum of the product exhibited characteristic ester and acid carbonyl absorptions at $5.75\mu$ and $5.85\mu$, respectively, and by titration as described in Example 1 was shown to comprise 1.4 percent acrylic acid and 0.4 percent ethyl acrylate, the balance being ethylene.

Example 3

A 100 gram sample of ethylene/ethyl acrylate copolymer containing 93 percent ethylene and 7 percent ethyl acrylate was converted to a corresponding ethylene/ethyl acrylate/acrylic acid terpolymer in the manner as described in Example 1 by treatment with a 0.5 N potassium hydroxide solution having the following composition: 900 milliliters xylene, 60 milliliters H$_2$O, 160 milliliters n-butanol, and 28 grams potassium hydroxide. After a reaction time of 1.5 hours at reflux, the system was acidified by adding 65 ml. of 37 percent HCl. The product was precipitated into excess isopropanol, filtered, and washed three times with water, three times with isopropanol, and then dried. The infrared spectrum of the product was characteristic of an ethylene/ethyl acrylate/acrylic acid These results demonstrate that ethylene/ethyl acrylate/acrylic acid terpolymers exhibit mechanical properties which are significantly better than those of the parent ethylene/ethyl acrylate copolymers, particularly when the copolymer contains larger amounts (>15 percent) of ethyl acrylate, as in Example 4. That superior mechanical properties are shown by the terpolymers is attributed in part to the fact that hydrogen bonding between the carboxyl groups of the terpolymer has occurred.

Example 5

Ethylene/n-butyl acrylate copolymer having a melt index of 1.3, an ethylene content of 70 percent, and a n-butyl acrylate content of 30 percent was converted to the corresponding ethylene/n-butyl acrylate/acrylic acid terpolymer having a melt index of 3.2 and containing combined therein 2.58 percent acrylic acid, 21.5 percent n-butyl acrylate, and 75.92 percent ethylene by use of the method described in Example 1. The composition of the hydrolysis system was as follows: 600 grams toluene and 31.25 milliliters of 2 N potassium hydroxide in methanol-n-butanol. Eighty milliliters of 3 N H$_3$PO$_4$ (0.08 mole) in methanol was used to acidify the reaction system following the saponification step. Isolation and purification of the product were as described in Example 1.

Example 6

A 75 gram sample of an ethylene/2-ethylhexyl acrylate copolymer having a melt index of 10.7, an ethylene content of 79 percent, and a 2-ethylhexyl acrylate content of 21 percent was converted to the corresponding ethylene/2-ethyl hexyl acrylate/acrylic acid terpolymer which had a melt index of 1.7, an acrylic acid content of 2.22 percent and a 2-ethylhexyl acrylate content of 1.2 percent described in Example 1. The hydrolysis system had the following composition: 450 grams toluene and 23.5 milliliters 2 N potassium hydroxide in methanol-n-butanol.

Eighty milliliters of 3 N $H_3PO_4$ (0.08 mole) in methanol was used to acidify the reaction system following the saponification step.

Physical properties of the terpolymers prepared in Examples 5 and 6, and of their respective parent ethylene/alkyl acrylate copolymers, were measured. The tests were conducted using compression molded plaques of the polymers, prepared in the manner described earlier. Table III records data for these experiments.

TABLE III

|  | Control 5<br>Ethylene/n-Butyl Acrylate Copolymer (70:30) | Example 5<br>Ethylene/n-Butyl Acrylate/Acrylic Acid Terpolymer (75.92:21.5:2.58) | Control 6<br>Ethylene/2-Ethyl Hexyl Acrylate Copolymer (79:21) | Example 6<br>Ethylene/2-Ethyl Hexyl Acrylate/Acrylic Acid Terpolymer (96.7:1:2.3) |
|---|---|---|---|---|
| Melt index (decigrams/minute) | 1.3 | 2.3 | 10.7 | 1.7 |
| Tensile strength (p.s.i.) | 1,095 | 1,330 | 790 | 1,310 |
| Elongation (percent) | 690 | 550 | 510 | 450 |
| Secant modulus (25° C.) | 3,740 | 4,440 | 4,525 | 7,290 |

These results demonstrate that the acrylic acid-containing terpolymers prepared from ethylene/n-butyl acrylate and ethylene/2-ethyl hexyl acrylate copolymers are of significantly greater tensile strength and stiffness than the parent copolymers.

*Example 7*

An ethylene/ethyl acrylate/acrylic terpolymer having a melt index of 3.5, an ethylene content of 93.8 percent, an ethyl acrylate content of 4.3 percent and an acrylic acid content of 1.5 percent, prepared by the method described in Example 1 except that 0.125 mole KOH per 100 g. copolymer was used in the saponification mixture, was compression molded into a 6″ x 6″ x 0.010″ film. A thin coating of a standard red flexographic printing ink was applied to the terpolymer film and to a similar film prepared from the parent ethylene/ethyl acrylate copolymer having a melt index of 3.8, an ethylene content of 93 percent and an ethyl acrylate content of 7 percent. The Scotch tape test was then conducted. A strip of pressure sensitive tape was applied to the dry, inked surface of each film and then removed. The adhesion of the ink to each film was determined by observing the amount of ink which was removed from the film. This test was also conducted using film prepared from the terpolymers and the parent copolymers described in Examples 5 and 6. Table IV records the results of these experiments.

TABLE IV

| Example Number | Melt Index (decigrams/minute) | Printability |
|---|---|---|
| Control 5 | 1.3 | Fair. |
| 5 | 3.2 | Excellent. |
| Control 6 | 10.7 | Poor. |
| 6 | 1.7 | Very good. |
| Control 7 | 3.8 | Fair. |
| 7 | 3.5 | Excellent. |

Thus, all the terpolymer samples showed greatly improved printability in comparison with their respective parent ethylene-alkyl acrylate copolymer.

*Example 8*

A compression molded, 10 mil film of an ethylene/ethyl acrylate/acrylic acid terpolymer having a melt index of 2.6 and containing 93.9 percent ethylene, 4 percent ethyl acrylate, and 2.1 percent acrylic acid, prepared by the method described in Example 1 except that 0.125 mole potassium hydroxide per 100 grams of copolymer was used in the saponification mixture, was coated with various materials which are known to be resistant to permeation by liquids such as lemon oil, the "essential oil" of the cosmetics industry, and the like. The adhesion of the coating to the plaque was tested as follows: the plaque was heated to 350° F. and the coating brushed on and dried. The Scotch tape test was conducted as described in Example 7. An ethylene homopolymer (melt index=1.0-1.5) and an ethylene/ethyl acrylate copolymer having a melt index of 4.0 and containing 93 percent ethylene and 7 percent ethyl acrylate were similarly tested. Table V records data collected from these tests.

TABLE V

| Sample | Saran[a] | Polyvinyl alcohol-Trimethylolphenol[b] | Epoxy resin[c] |
|---|---|---|---|
| Ethylene/ethyl acrylate/acrylic acid terpolymer (93.9:4:2.1; melt index=2.6). | Excellent | Excellent | Excellent. |
| Ethylene/ethyl acrylate copolymer (93:7; melt index=4.0). | Poor | Fair | Do. |
| Ethylene homopolymer (melt index=1.0-1.5). | do | Good | Good. |

[a] Saran: a copolymer of vinylidene chloride with vinyl chloride and/or minor amounts of other vinyl monomers.
[b] 1 percent solution of an equimolar mixture.
[c] Epoxy resin: the diglycidyl ether of 2,2-bis(p-hydroxyphenyl) propane.

These results demonstrate the superior adhesion of the permeation barrier coatings tested to ethylene/ethyl acrylate/acrylic acid terpolymer as compared with an ethylene homopolymer or an ethylene/ethyl acrylate copolymer.

*Example 9*

The permeation resistance of an ethylene/ethyl acrylate/acrylic acid terpolymer having a melt index of 3.2 and containing combined therein 94.7 percent ethylene, 1 percent ethyl acrylate, and 4.3 percent acrylic acid prepared by the method described in Example 1, was determined, using lemon oil as the permeator. The test consisted of exposing one surface of a compression-molded disc (2″ in diameter x 0.040″ thick) of the terpolymer to the lemon oil and following the increase in the amount of lemon oil absorbed with increasing time, using infrared spectrophotometric techniques. The characteristic infrared absorption band of lemon oil at 6.1μ was used to detect the presence of the oil in the discs. The permeability of lemon oil of similar discs of ethylene/ethyl acrylate copolymer having a melt index of 3.8 and containing combined thereon 93.7 percent ethylene and 6.3 percent ethyl acrylate, low density polyethylene, and high density polyethylene was determined in the same manner. The results are compared in Table VI, with the materials listed in order of increasing permeability.

TABLE VI

| Hours of exposure to lemon oil | $I_0$ Absorbance (Log I) at 6.1μ | | | | |
|---|---|---|---|---|---|
| | 0.25 | 1.0 | 2.0 | 4.0 | 6.0 |
| Material: | | | | | |
| Ethylene/ethyl acrylate/acrylic acid terpolymer (99.4:1:4.3; melt index=3.2) | Nil | 0.038 | 0.038 | 0.064 | |
| High density polyethylene (density=0.96; melt index=2.0) | Nil | Nil | 0.06 | 0.09 | 0.12 |
| Ethylene/ethyl acrylate copolymer (93:7; melt index=3.8) | 0.096 | 0.37 | 0.35 | 0.74 | |
| Low density polyethylene (density=0.92; melt index=1.0) | 0.16 | 0.42 | 0.49 | 0.68 | |

These results demonstrate that the terpolymer is better in permeation resistance to lemon oil than any of the other materials tested.

*Example 10*

Table VII represents a comparison of several physical properties exhibited by polyethylene, ethylene/ethyl acrylate, and ethylene/ethyl acrylate/acrylic acid polymers. In almost every instance it will be noted that the ethylene/ethyl acrylate/acrylic acid terpolymers of this invention show improvement in the properties measured over polyethylene and the parent ethylene/ethyl acrylate copolymer.

TABLE VIII

| Property | Control Experiments Ethylene/Acrylic Acid Copolymer, prepared in— | | Terpolymer of this invention Ethylene/Ethyl Acrylate/Acrylic Acid Terpolymer [c] |
|---|---|---|---|
| | Stirred Autoclave [a] | Tubular Reactor [b] | |
| Melt index, grams per 10 min | 0 | 0.26 | 0.7 |
| Modulus, p.s.i. | 28,423 | 47,230 | 12,731 |
| Tensile, p.s.i. | 2,106 | 2,470 | 3,669 |
| Tensile, impact, ft.-lbs./cu. in. | 165 | | 935 |
| Ultimate elongation, percent | 120 | 125 | 430 |
| Printability | VG-E | | E |
| Ease of orientation at 23° C. and 80° C. | P | | E |
| Adhesion to: | | | |
| Steel | P | | G |
| PVA/THMP [d] | P | | E |
| Saran | P | | E |

[a] 9.2 weight percent acrylic acid.
[b] 14 weight percent acrylic acid.
[c] 7.8 weight percent acrylic acid, 0-0.4 weight percent ethyl acrylate.
[d] Polyvinyl alcohol-trimethylol phenol copolymer.

*Example 12*

An ethylene/ethel acrylate/acrylic acid terpolymer of modulus 12,730 which comprises 7.8 weight percent

TABLE VII

| Physical Properties | Units | Polymer composition (weight percent) | | | | | | |
|---|---|---|---|---|---|---|---|---|
| | | Polyethylene | Ethylene/Ethyl Acrylate | | Ethylene/Ethyl Acrylate/Acrylic Acid | | | |
| | | | 93:7 | 85:15 | 7.8 AA, 0-0.4 EA | 2.4 AA, 11 EA | 1.3 AA, 3-5 EA | 3.6 AA, 1-2 EA |
| Density | | 0.916 | 0.930 | 0.935 | 0.935 | 0.943 | 0.927 | |
| 1 P melt index | G./10 min./44 p.s.i. | 2 | 2.2 | 5 | 0.7 | 1.6 | 3.5 | 0.7 |
| 10 P melt index | G./10 min./440 p.s.i. | 140 | 86 | | 45 | 110 | 164 | 52 |
| Tensile impact at 23° C | Ft.-lbs./cu. in. | 190 | 493 | 507 | 935 | 556 | 394 | 702 |
| Modulus at 23° C | P.s.i. | 18,200 | 11,200 | 3,710 | 12,731 | 3,000 | 12,413 | 14,440 |
| Compression cut through | Lbs./in. | 1,690 | 2,440 | | | 2,950 | | |
| Visual clarity | | P | P | G | G | E | G | |
| Haze | Percent | 33 | 67 | | 25 | 11 | 34 | |
| Transmission | do | 84 | 99 | | 87 | 99 | 100 | |
| Softening point | ° C | 82 | 70 | | 87 | 56 | 68 | |
| Melting point | ° C | 103 | 84 | 76 | 92 | 74 | 88 | 90 |
| Vicat temperature | ° C | 90 | 66 | 57 | 86 | 61 | 84 | 86 |
| Bonding power of polymer for: | | | | | | | | |
| Glass | | P | F | | E | E | E | G |
| Wood | | P | F | | E | F-G | F-G | E |
| Steel | | P | G | | G | F-G | F-G | P |
| Adhesion of copolymer to: | | | | | | | | |
| Epoxy (wetting adhesion.) | | P(P) | P(E) | | F(E) | G(E) | F(E) | E(E) |
| Saran | | P | F | | P | E | G | G |
| Dextrin | | P | P | | P | P | P | P |
| Printability | | P | F | | E | E | E | VG |
| Static pickup | | P | P | | P | P | P | P |
| Creep at 700 p.s.i., 23° C.: Time to 10% (*7%) strain. | Min | 800 | 1 | | | 1 | *110,000 | |
| Tensile at 80° C | P.s.i. | 9,300 | 12,200 | | 16,800 | 14,000 | 11,500 | |

*Example 11*

Table VIII compares some properties of two ethylene/acrylic acid copolymers, one prepared in a stirred autoclave and the other in a tubular reactor, with an ethylene/ethyl acrylate/acrylic acid terpolymer. The table shows that both copolymers are inferior to the terpolymer in the properties tested.

acrylic acid and 0–0.4 weight percent ethyl acrylate, and a terpolymer of the same composition of modulus 14,440 which comprises 3.6 weight percent acrylic acid and 1–2 weight percent ethyl acrylate, display physical properties which are superior to comparable samples of both low density polyethylene and ethylene-ethyl acrylate copolymer, as is shown in Table IX.

TABLE IX

| Property | Units | Low Density Polyethylene | Ethylene/Ethyl Acrylate Copolymer (6-8 weight percent ethyl acrylate) | Ethylene/Ethyl Acrylate/Acrylic Acid Terpolymers (7.8 weight percent acrylic acid, 0-0.4 weight percent ethyl acrylate) |
|---|---|---|---|---|
| Modulus | P.s.i. | 18,200 | 11,200 | 12,731 |
| Tensile strength | P.s.i. | 1,800 | 2,300 | 3,669 |
| Yield strength | P.s.i. | 1,300 | 2,390 | 3,669 |
| Tensile impact | Ft.-lbs./cu. in. | 190 | 493 | 935 |
| Grease resistance | Hrs. | 2 | 4 | 24 |
| Adhesion to— | | | | |
| Glass | | P | F | E |
| Wood | | P | G | G |
| Steel | | P | G | E |
| Tensile after orientation | P.s.i. | 9,300 | 12,200 | 16,800 |
| Stress crack resistance in Hostapal | Hrs. to $F_{50}$ | 1 | 500 | 500 |
| Vicat heat distortion temp. | °C | 90 | 66 | 86 |
| Clarity | | P | P | G |
| Printability | | P | F | E |
| Creep, time to 10% Strain, 700 p.s.i., 23° C. | Min. | 800 | 1 | 110,000 |
| Tensile impact at 30° C | Ft.-lbs./cu. in. | 74 | 297 | 396 |

As was pointed out above, a most important facet of this invention is the discovery that stable, non-creaming emulsions can be prepared with ease from high molecular weight ethylene/alkyl acrylate/acrylic acid terpolymers, i.e., those terpolymers having melt indices as low as about 0.5 decigram per minute. In the past, attempts to prepare emulsions of high molecular weight polyolefins (i.e., melt index below about 100 decigrams/minute) were unsuccessful. Emulsions heretofore could be prepared only from polymers of such low molecular weights as to render them greases or oils. These emulsions of low molecular weight polymers, while useful in certain limited areas, could not be employed in any application, for example coatings, where strength and wear are essential. The high molecular weight polymer emulsions of this invention, now to be fully described can, however, be used in various coating compositions, for cloth embossing, cloth sizing, and adhesives, and as bonding materials for lamination of cloth, paper, wood, plastics and the like.

The ethylene/alkyl acrylate/acrylic acid terpolymer used in high molecular weight terpolymer emulsions can contain from about 30 to 40 weight percent, and preferably from about 3 to 10 weight percent, combined acrylic acid. The amounts of alkyl acrylate and ethylene combined therein are not particularly critical. It is preferred, however, that combined ethylene comprise from about 80 to 96 weight percent of the terpolymer, with the balance being combined alkyl acrylate. The preferred alkyl acrylate is ethyl acrylate.

The molecular weight of the terpolymer to be emulsified can vary within a wide range; polymers having a melt index as low as 0.5, in addition to very low molecular weight terpolymers, can be emulsified.

Emulsion can be achieved in any manner commonly employed in the art as long as the emulsification equipment provides intimate mixing. Typically the emulsions are prepared by adding to the terpolymer a fatty acid having the general formula $$C_nH_{2n+(x)}COOH$$

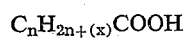

wherein $n$ is an integer from 0 to 32 and $x$ is an odd number from −5 to +1 with the proviso that when $n=0$, $x=+1$. Examples of such fatty acids are formic, acetic, propionic, butyric, valeric, caproic, enanthymic, caprylic, pelargonic, capric, undecylic, lauric, tridecoic, myristic, pentadecanoic, palmitic, megaric, stearic, nondecylic, arachidic, behenic, carnaubic, hyenic, carborceric, cerotic, laccroic, melissic, montanic, psyllic, acrylic, crotonic, isohexenic, tetracrylic, hypogeic, oleic, elaidic, erucic, brassidic, propiolic, propynoic, tetrolic, 2-butanoic, pentanoic, palmitotic, stearolic, behenolic, sorbic, linoleic, and linolenic acids.

An amine, such as mono- and triethanolamine, monoisopropanolamine, diisopropanolamine, triisopropanolamine, morpholine, N,N-dimethylethanolamine, and N,N-diethanolamine, and the like, is then added.

The mixture is stirred or blended in a suitable device such as a rotor mill until it becomes clear or is thoroughly mixed. Water, normally heated to just below its boiling point, is then added with additional stirring. This mixture is then vigorously agitated in a bladed mixer, rotor mill, colloid mill or other shear-producing apparatus to form the emulsion. Stable emulsions are those which vary less than about 1 percent in solids content upon standing for one week.

Other ingredients, such as colorants, extenders, modifiers, and the like can be added to the emulsions herein described.

The following examples illustrate, but are not restrictive of, the high molecular weight ethylene/alkyl acrylate/acrylic acid terpolymer emulsions which can be formed.

Example 13

One hundred grams of an ethylene/ethyl acrylate/acrylic acid terpolymer having a melt index of 2.6, an ethylene content of 70.8 percent, an ethyl acrylate content of 6.0 percent, and an acrylic acid content of 23.2 percent was charged to a Calvert planetary rotor mill. The polymer was heated to 100° C. and fluxed in the mill. A morpholine-oleic acid emulsifier system comprising 30 parts oleic acid and 55 parts morpholine per 100 parts terpolymer was then charged to the mill with the oleic acid being charged first and blended with the terpolymer and the morpholine then being added and blended into the terpolymer-oleic acid mixture.

The temperature of the rotor mill was lowered to about 93° C. and water was added to the system in about 25 milliliter increments. Each portion of water was thoroughly blended into the mixture before the next portion was added, resulting in formation of an emulsion by phase inversion, i.e., by initial formation of a water in oil emulsion inverting subsequently to an oil in water emulsion as the quantity of water was increased. The viscosity of the system decreased with addition of each portion of water until finally the mixing action of the mill no longer was effective. At this point the mill was discharged under slight nitrogen pressure. There was recovered 350 milliliters of a tan aqueous emulsion of the terpolymer containing 23.2 percent solids. The emulsion could be diluted more than 20 fold with additional water with no evidence of solids separation. Neither the original emulsion nor the diluted emulsion showed evidence of solids separation after standing at room temperature one month.

Based on the solids content, the emulsion was calculated as having the following composition:

| | Parts |
|---|---|
| Terpolymer | 100 |
| Oleic acid | 30 |
| Morpholine | 55 |
| Water | 375 |

*Example 14*

Two hundred grams of an ethylene/ethyl acrylate/acrylic acid terpolymer having a melt index of 1.9, an ethylene content of 85.2 percent, an ethyl acrylate content of 11 percent, and an acrylic acid content of 3.8 percent was charged to a Calvert planetary rotor mill and heated to 100° C. The procedure described in Example 13 was followed to prepare an aqueous emulsion of the terpolymer, using the following formulation:

| | Parts |
|---|---|
| Terpolymer | 200 |
| Oleic acid | 60 |
| Morpholine | 107 |
| Water | 600 |

The emulsion was stable upon standing and dilution and had a total solids content of 27.3 percent.

*Example 15*

One hundred grams of a melted ethylene/ethyl acrylate/acrylic acid terpolymer having a viscosity of 300 centipoises when melted and having an ethylene content of 95 percent, an ethyl acrylate content of 1 percent, and an acrylic acid content of 4 percent was poured into 600 milliliters of boiling water containing 10 grams oleic acid and 10 grams morpholine. Most of the terpolymer was emulsified immediately. The mixture was stirred and filtered from a small amount of unemulsified solids. The remaining emulsion was free of suspended matter and did not separate after storage at room temperature for one month. The emulsion contained 12.6 percent total solids.

*Example 16*

A thin coating of the emulsion prepared in Example 14 was permitted to dry on the walls of (A) a glass container and (B) a stainless steel rod. In both cases there resulted tough, continuous terpolymer film which could be removed from these substrates only with difficulty. The emulsion can also be used to coat other substrates such as wood, plastics and cloth. Similar tough, adherent films are obtained.

What is claimed is:

1. A terpolymer of ethylene, alkyl acrylate and acrylic acid having a melt index of at least 0.5 at 190° C. and 44 p.s.i. which comprises a predominant amount of combined ethylene, from about 0.1 to about 40 weight percent combined acrylic acid, and up to 30 weight percent combined alkyl acrylate, said alkyl group containing from 1 to 12 carbon atoms, said terpolymer having been made by the hydrolysis of an ethylene/alkyl acrylate copolymer.

2. Terpolymer of ethylene, alkyl acrylate, and acrylic acid having a melt index of at least 0.5 at 190° C. and 44 p.s.i. which comprises from 64 to 99.4 weight percent combined ethylene, from 0.1 to 6 weight percent combined acrylic acid, and from 0.5 to 30 weight percent combined alkyl acrylate wherein the alkyl group contains from 1 to 12 carbon atoms, said terpolymer having been made by the hydrolysis of an ethylene/alkyl acrylate copolymer.

3. Terpolymer claimed in claim 2 wherein combined alkyl acrylate comprises from 15 to 20 weight percent of the terpolymer.

4. Terpolymer claimed in claim 2 wherein combined alkyl acrylate comprises from 0.5 to 2 weight percent and combined acrylic acid comprises from 3 to 5 weight percent of the terpolymer.

5. Terpolymer claimed in claim 2 wherein the melt index is from 0.50 to 30.

6. Terpolymer claimed in claim 5 wherein said combined alkyl acrylate contains from 2 to 8 carbon atoms in the alkyl group.

7. Terpolymer claimed in claim 6 wherein said combined alkyl acrylate is ethyl acrylate.

8. Terpolymer claimed in claim 6 wherein said combined alkyl acrylate is a butyl acrylate.

9. The alkaline hydroxide saponification product of an ethylene-alkyl acrylate copolymer wherein said saponification product is terpolymeric and comprises a predominant amount of combined ethylene and up to 30 weight percent alkyl acrylate, said alkyl group containing from 1 to 12 carbon atoms, inclusive.

10. The alkaline hydroxide saponification product of claim 9 wherein the alkaline hydroxide is potassium hydroxide.

11. The alkaline hydroxide saponification product of claim 9 wherein the alkyl acrylate is ethyl acrylate.

12. The alkaline hydroxide saponification product of claim 9 wherein the alkyl acrylate is n-butyl acrylate.

13. The alkaline hydroxide saponification product of claim 9 wherein the alkyl acrylate is 2-ethyl-hexyl acrylate.

14. The alkaline hydroxide saponification product of claim 9 wherein the ethylene/alkyl acrylate copolymer contains combined ethylene and alkyl acrylate in a mole ratio of from 3.33:0.07 to 2.4:0.33.

15. The alkaline hydroxide saponification product of an ethylene-alkyl acrylate copolymer wherein said saponification product is terpolymeric, comprises from 64 to 99.4 weight percent combined ethylene, and from about 0.5 to about 30 weight percent alkyl acrylate, said alkyl group containing from 1 to 8 carbon atoms inclusive.

16. The alkaline hydroxide saponification product of claim 15 wherein the alkyl acrylate is ethyl acrylate.

17. The stable emulsion comprising water, emulsifying agents and an ethylene/alkyl acrylate/acrylic acid terpolymer comprising a predominant amount of combined ethylene, from about 3 to about 40 weight percent acrylic acid, and up to 30 weight percent alkyl acrylate, said alkyl group containing from 1–12 carbon atoms and said terpolymer having been made by the hydrolysis of an ethylene/alkyl acrylate copolymer.

18. The stable emulsion of claim 17 wherein said alkyl acrylate is ethyl acrylate.

19. A stable emulsion comprising water, emulsifying agents and an ethylene/ethyl acrylate/acrylic acid terpolymer comprising from about 3 to about 10 weight percent combined acrylic acid, from about 80 to 96 weight percent combined ethylene, the remainder being combined ethyl acrylate, said terpolymer having a melt index as low as 0.5 decigram per minute having been made by the hydrolysis of an ethylene/alkyl acrylate copolymer.

20. A coating formed from the emulsion claimed in claim 17.

References Cited by the Examiner

UNITED STATES PATENTS

| 2,958,674 | 11/1960 | Arnold | 260—89.5 |
| 3,029,228 | 4/1962 | Glavis | 260—86.7 |
| 3,141,870 | 7/1964 | Deex | 260—87.3 |
| 3,201,374 | 8/1965 | Simms | 260—80.5 |

MURRAY TILLMAN, *Primary Examiner.*

N. F. OBLON, *Assistant Examiner.*

Notice of Adverse Decision in Interference

In Interference No. 95,849 involving Patent No. 3,249,570, J. E. Potts, C. L. Purcell and R. J. Turbett, TERPOLYMER OF ETHYLENE, ALKYL ACRYLATE AND ACRYLIC ACID, final judgment adverse to the patentees was rendered Mar. 30, 1970, as to claims 9–16.

[*Official Gazette September 8, 1970.*]